(12) United States Patent
Kim et al.

(10) Patent No.: US 7,971,022 B2
(45) Date of Patent: Jun. 28, 2011

(54) APPARATUS AND METHOD OF PROCESSING DATA OF NON-VOLATILE MEMORY USING TRANSACTION BLOCK

(75) Inventors: Hyo-Jun Kim, Yongin-si (KR); Nam-Yoon Woo, Suwon-si (KR); Ji-Hyun In, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 771 days.

(21) Appl. No.: 11/947,926

(22) Filed: Nov. 30, 2007

(65) Prior Publication Data

US 2008/0301393 A1  Dec. 4, 2008

(30) Foreign Application Priority Data

May 29, 2007  (KR) .................. 10-2007-0052154

(51) Int. Cl.
*G06F 12/00* (2006.01)
(52) U.S. Cl. .... 711/170; 711/103; 711/156; 365/185.33
(58) Field of Classification Search .................. 711/170, 711/156, 103; 365/185.33
See application file for complete search history.

(56) References Cited

U.S. PATENT DOCUMENTS

| | | | | |
|---|---|---|---|---|
| 5,524,230 | A | * | 6/1996 | Sakaue et al. .................. 711/103 |
| 5,832,493 | A | * | 11/1998 | Marshall et al. ............... 707/697 |
| 7,254,592 | B1 | * | 8/2007 | Matero ................................. 1/1 |
| 2007/0300013 | A1 | * | 12/2007 | Kitamura ...................... 711/114 |

FOREIGN PATENT DOCUMENTS

| | | |
|---|---|---|
| JP | 2001-154909 A | 6/2001 |
| JP | 2003-044351 A | 2/2003 |
| JP | 2004-242160 A | 8/2004 |
| JP | 2006-126919 A | 5/2006 |

* cited by examiner

*Primary Examiner* — Stephen C Elmore
(74) *Attorney, Agent, or Firm* — Sughrue Mion, PLLC

(57) ABSTRACT

An apparatus for processing data of a non-volatile memory includes a non-volatile memory having a plurality of blocks, an operation processing unit which, when a write operation is requested from a user, writes data in the plurality of blocks, and a block managing unit which collectively converts the plurality of blocks, where the data is written, to a plurality of data blocks and manages statuses of the plurality of blocks to correspond to an operation process performed by the operation processing unit.

20 Claims, 7 Drawing Sheets

APPARATUS AND METHOD OF PROCESSING DATA OF NON-VOLATILE MEMORY USING TRANSACTION BLOCK

CROSS REFERENCE TO RELATED APPLICATION

This application claims priority from Korean Patent Application No. 10-2007-0052154 filed on May 29, 2007, in the Korean Intellectual Property Office, the disclosure of which is incorporated herein by reference in its entirety.

BACKGROUND OF THE INVENTION

1. Field of the Invention

Apparatuses and methods consistent with the present invention relate to processing data of a non-volatile memory, and more particularly, to processing data of a non-volatile memory that is capable of applying a writing unit operation to a plurality of sectors.

2. Description of the Related Art

In general, in embedded systems, for example, home appliances, communication apparatuses, set-top boxes or the like, non-volatile memories are mainly used as storage media that store and process data.

A flash memory, which is mainly used among the non-volatile memories, is a non-volatile storage element that can electrically delete data and rewrite the data. As compared with a storage medium based on a magnetic disk memory, the flash memory has a fast access time like a hard disk while only consuming a small amount of power, and has a small size. As a result, the flash memory is suitable for a portable apparatus.

The flash memory has different characteristics from those of a magnetic storage medium, such as a hard disk. Specifically, in the flash memory, a read/write operation can be performed as a page unit, while a data update operation cannot be performed as a page unit. In order to perform the data update operation in the flash memory, an erasing operation needs to be performed in a unit of a block that is a group of a plurality of pages. Here, there is a problem in that a unit of the erasing operation is larger than a unit of the write operation.

In order to compensate for disadvantages of the flash memory in that the unit of the erasing operation is larger than the unit of the write operation and the number of times data is deleted is restricted and use a file system that is designed on the basis of a hard disk, an FTL (Flash Translation Layer) has developed. The FTL is a type of software layer and allows the flash memory to be used like the hard disk. In order to achieve the above-described function, the FTL internally uses a mapping method, and its function and costs are determined according to an algorithm used.

Examples of the mapping method that is used in the FTL include a variety of mapping methods, such as a block mapping method and a page mapping method. The page mapping method will be exemplified. In the page mapping method, locations of data that are physically stored with respect to all sectors or pages are maintained and managed through a separate mapping table. That is, when the data update operation is actually performed in the flash memory, new data is written in the available free space of the flash memory, and when a location of a corresponding sector is changed, a sector mapping table is changed. At this time, each sector is a logical operation unit and each page is a physical operation unit. In a small-block flash memory, a sector and a page are the same, while, in a large-block flash memory, a page includes a plurality of sectors.

FIG. 1 is a diagram illustrating a page mapping method according to the related art.

As shown in FIG. 1, in a non-volatile memory 20 that includes a sector mapping table 10 and a plurality of blocks 22, when a user writes data in sectors in the sector number order of "1, 2, 0, 0, 3, 3, 3, 5, 6, and 4", it can be understood that data has been updated in the sector 0 and the sector 3 in the non-volatile memory 20. At this time, in the FTL that uses the page mapping method, new data is written in a free page 21 and the sector mapping table 10 is also updated. That is, the sector mapping table 10 becomes a mapping table between logical sector numbers and page numbers in the non-volatile memory 20.

Meanwhile, when a file system or a database is updated, an update operation of a plurality of sectors is performed. For example, when the sectors 1, 2, and 3 need to be updated, the write operation may be completed only in the sectors 1 and 2 due to a problem in the system, and then the write operation may be interrupted. In this case, the sector 3 becomes unstable such that the update operation is not performed, and as the result, it is not possible to secure the integrity of the file system or the database.

For this reason, a method has been used in which a journal or a log is displayed with respect to the operation that is processed in the database or the file system. This method is to backup original data in case the operation is interrupted and not completed. However, in general, the backup method is much more expensive to implement than the operation which the user desires to process.

Japan Laid-open Publication No. 2004-242160 discloses a method and corresponding apparatus for writing data at a high speed in which a data deleting process and a write completion notification in a flash memory overlap and a series of processes including write, deletion, and a write completion notification are performed in a short time. However, Japan Laid-open Publication No. 2004-242160 does not disclose a method in which the integrity of a file system or a database can be secured during the operation for updating a plurality of sectors.

SUMMARY OF THE INVENTION

An aspect of the invention is to provide an apparatus and method of processing data of a non-volatile memory that is capable of applying a writing unit operation to a plurality of sectors by using a transaction block, and collectively converting the transaction block into a data block to secure the integrity of a file system or a database.

Aspects of the invention are not limited to those mentioned above, and other aspects of the invention will be apparently understood by those skilled in the art through the following description.

According to one aspect of the invention, there is provided an apparatus for processing data of a non-volatile memory, the apparatus including a non-volatile memory having a plurality of blocks, an operation processing unit which writes, when a write operation is requested from a user, data in the blocks and allows the blocks, where the data is written, to become collectively effective, and a block managing unit which manages statuses of the blocks to correspond to the operation process performed by the operation processing unit.

According to another aspect of the invention, there is provided a method of processing data of a non-volatile memory, the method including inputting a write operation request from a user to a non-volatile memory having a plurality of blocks, writing data in the blocks and allowing the blocks, where the data is written, to become collectively effective, and managing statuses of the blocks to correspond to the operation process.

BRIEF DESCRIPTION OF THE DRAWINGS

The above and other features of the invention will become more apparent by describing in detail exemplary embodiments thereof with reference to the attached drawings in which.

DESCRIPTION OF EXEMPLARY EMBODIMENTS

Figure 1:
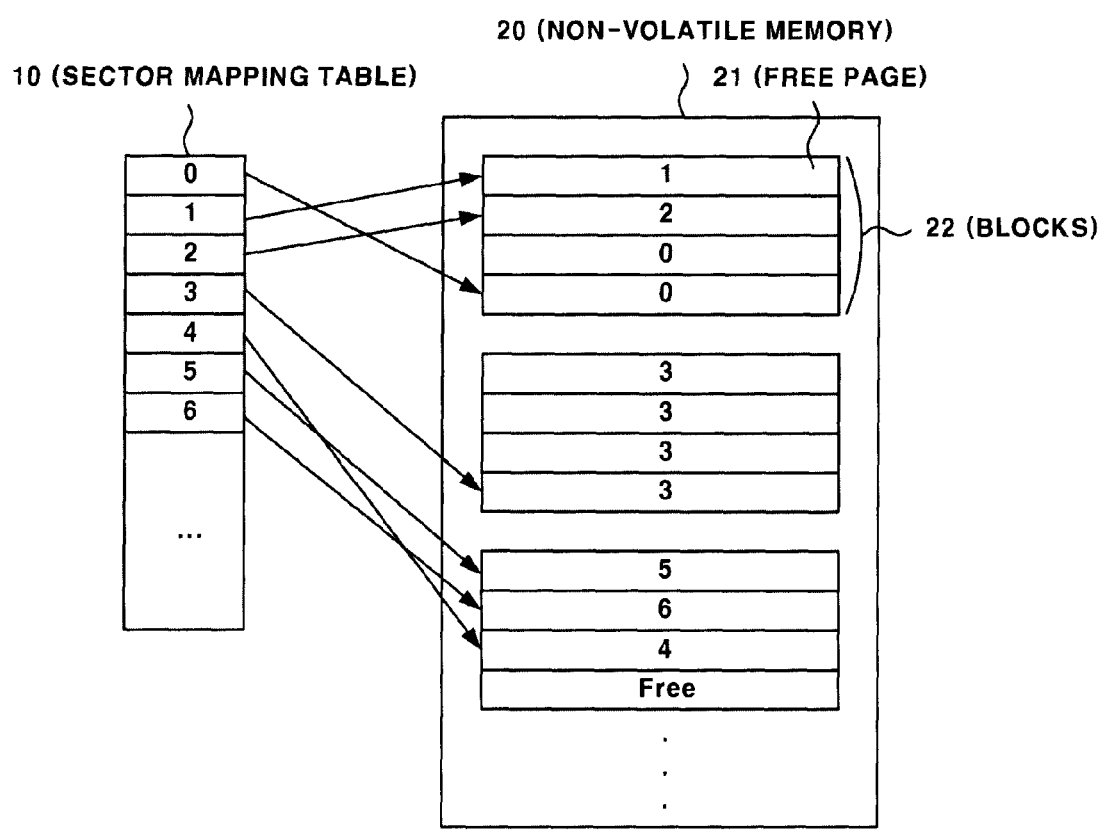
FIG. 1 is a diagram illustrating a page mapping method according to the related art.

Features of the invention and methods of accomplishing the same may be understood more readily by reference to the following detailed description of exemplary embodiments and the accompanying drawings. The invention may, however, be embodied in many different forms and should not be construed as being limited to the embodiments set forth herein. Rather, these embodiments are provided so that this disclosure will be thorough and complete and will fully convey the concept of the invention to those skilled in the art, and the invention will only be defined by the appended claims. Like identification codes refer to like elements throughout the specification.

The invention will be described hereinafter with reference to block diagrams or flowchart illustrations of an apparatus and method of processing data of a non-volatile memory according to an exemplary embodiment thereof. It is to be understood that blocks in the accompanying block diagrams and compositions of steps in flow charts can be performed by computer program instructions. These computer program instructions can be loaded onto processors of, for example, general-purpose computers, special-purpose computers, and programmable data processing apparatuses. Therefore, the instructions performed by the computer or the processors of the programmable data processing apparatus generate means for executing functions described in the blocks in block diagrams or the steps in the flow charts. The computer program instructions can be stored in a computer available memory or a computer readable memory of the computer or the programmable data processing apparatus in order to realize the functions in a specific manner. Therefore, the instructions stored in the computer available memory or the computer readable memory can manufacture products including the instruction means for performing the functions described in the blocks in the block diagrams or the steps in the flow charts. Further, the computer program instructions can be loaded onto the computer or the computer programmable data processing apparatus. Therefore, a series of operational steps is performed in the computer or the programmable data processing apparatus to generate a process executed by the computer, which makes it possible for the instructions driving the computer or the programmable data processing apparatus to provide steps of executing the functions described in the blocks of the block diagrams or the steps of the flow charts.

Each block or each step may indicate a portion of a module, a segment or a code including one or more executable instructions for performing a specific logical function (or functions). It should be noted that, in some modifications of the invention, the functions described in the blocks or the steps may be generated out of order. For example, two blocks or steps continuously shown can be actually performed at the same time, or they can sometimes be performed in reverse order according to the corresponding functions.

The invention will now be described more fully with reference to the accompanying drawings, in which preferred embodiments of the invention are shown.

Figure 2:
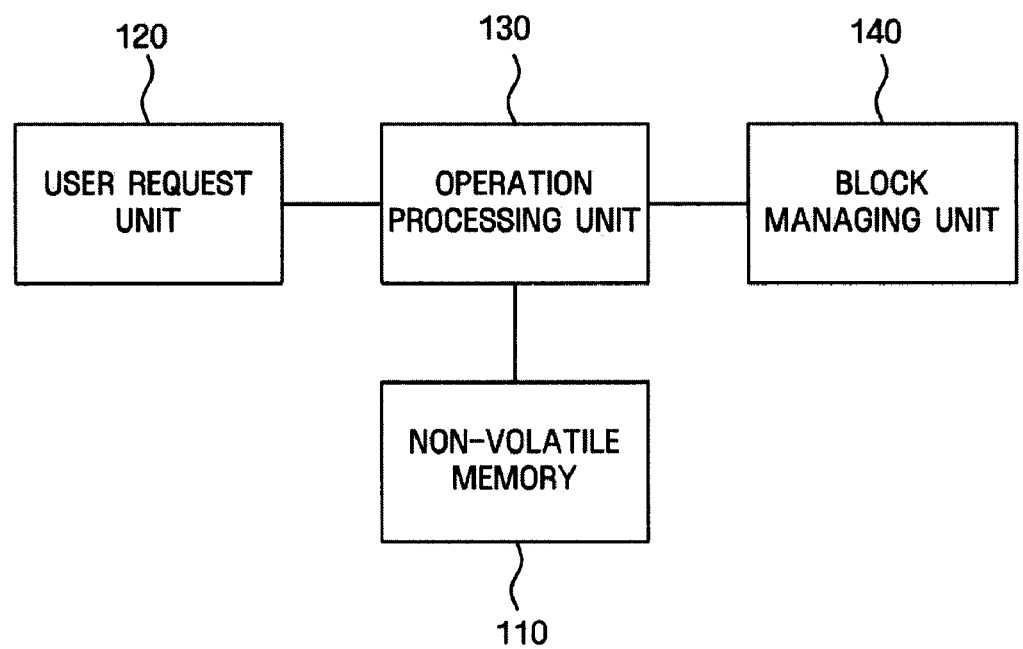
FIG. 2 is a diagram illustrating an apparatus for processing data of a non-volatile memory according to an exemplary embodiment of the invention.

FIG. 2 is a diagram illustrating an apparatus for processing data of a non-volatile memory according to an embodiment of the invention.

As shown in FIG. 2, an apparatus for processing data 100 of a non-volatile memory according to the embodiment of the invention includes a non-volatile memory 110, a user request unit 120, an operation processing unit 130, and a block managing unit 140.

The non-volatile memory 110 includes a plurality of blocks that include a plurality of pages. In this embodiment, the blocks that are included in the non-volatile memory 110 may be used for a map block, a garbage block, a data block, and a transaction block.

The map block stores status information of all of the blocks included in the non-volatile memory 110 and a mapping table, and the garbage block can be used after performing an erasing operation because effective data does not exist. The data block has a committed stable data and the transaction block is allocated when a transaction starts. Further, the garbage block may be used as the map block, the data block, and the transaction block.

In this embodiment, the description is given to the case where all of the blocks except for one map block become a garbage block at the time of an initial format operation in the non-volatile memory 110. However, this is only one example for the understanding of the invention and one or more map blocks may exist.

The user request unit 120 may receive a request from a user about a predetermined write operation. Further, the user request unit 120 may receive a read operation, an erasing operation, and an operation interruption request for a currently performed operation, in addition to the write operation request. In this embodiment, the description is given to the case where the write operation request from the user is input through the user request unit 120.

The operation processing unit 130 may process the requested operation according to the operation request that has been input through the user request unit 120. That is, the operation processing unit 130 processes an operation according to an FTL (Flash Translation Layer). The general FTL applies four Application Programming Interfaces (APIs) that include "device open (FTL_Open)", "device close (FTL_Close)", "read (FTL_Read)", and "write (FTL_Write)", while an FTL according to the present exemplary embodiment of the invention further applies three APIs including "transaction start (FTL_BeginTxn)", "transaction commit (FTL_CommitTxn)", and "transaction stop (FTL_AbortTxn)", in addition to the above-described four APIs.

Specifically, the operation processing unit 130 calls "write" several times between the "transaction start" and the "transaction commit", when the write operation is requested from the user request unit 120. When a system is interrupted or power supply is interrupted before the "transaction commit" is called, all the write operations are cancelled. Meanwhile, the user explicitly calls the "transaction stop" to cancel the write operation. Further, the user can call the APIs, such as the "transaction start", the "transaction commit", and the "transaction stop", by using the user request unit 120.

As described above, the operation processing unit 130 performs the operation process. The block managing unit 140 manages the blocks that are included in the non-volatile memory 110 to correspond to the write operation. That is, when the transaction starts by the operation processing unit 130, the block managing unit 140 allocates the garbage block to allow the transaction to be performed. Further, through the mapping table, the block managing unit 140 can manage stable data and unstable data, that is, the committed block and the block in which the transaction starts but commitment is not made.

Figure 3:
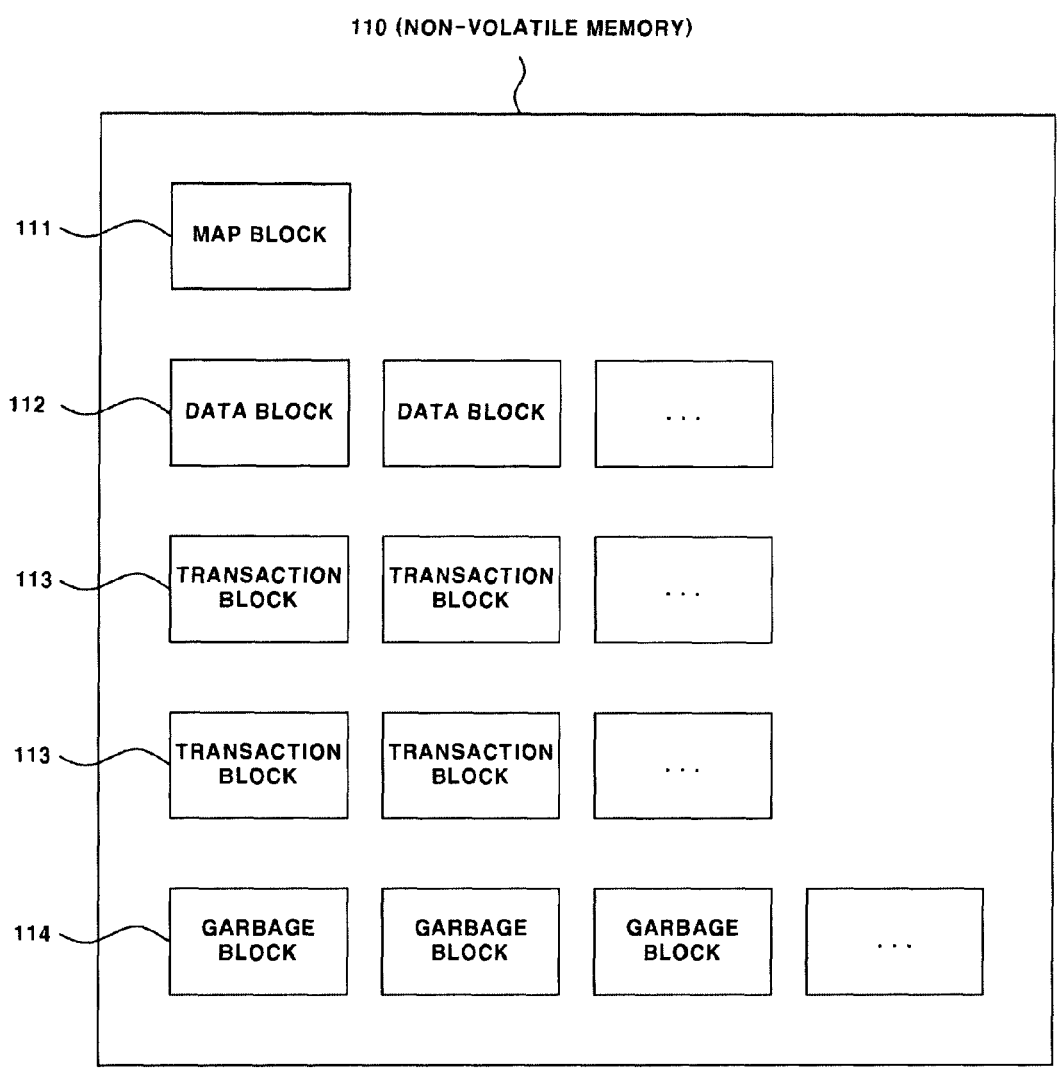
FIG. 3 is a diagram illustrating a structure of a non-volatile memory according to an exemplary embodiment of the invention.

Specifically, the block managing unit 140 can manage the blocks by dividing the blocks included in the non-volatile memory 110 into the map block 111, the data block 112, the transaction block 113, and the garbage blocks 114, as shown in FIG. 3. In FIG. 3, the map block 111, the data block 112, the transaction block 113, and the garbage block 114 exist. However, at the time of formatting the non-volatile memory 110, the map block 111 and the garbage block 114 exist, and the number of each of the map block 111, the data block 112, the transaction block 113, and the garbage block 114 may be changed according to the processing operation.

The block managing unit 140 manages the blocks by dividing the blocks in the non-volatile memory cell 110 into the map block, the data block, the transaction block, and the garbage block. When the transaction is committed, the block managing unit 140 can convert the corresponding block into the data block from the transaction block, and this operation can be performed by converting a status of each block that is recorded in the map block.

Figure 4:
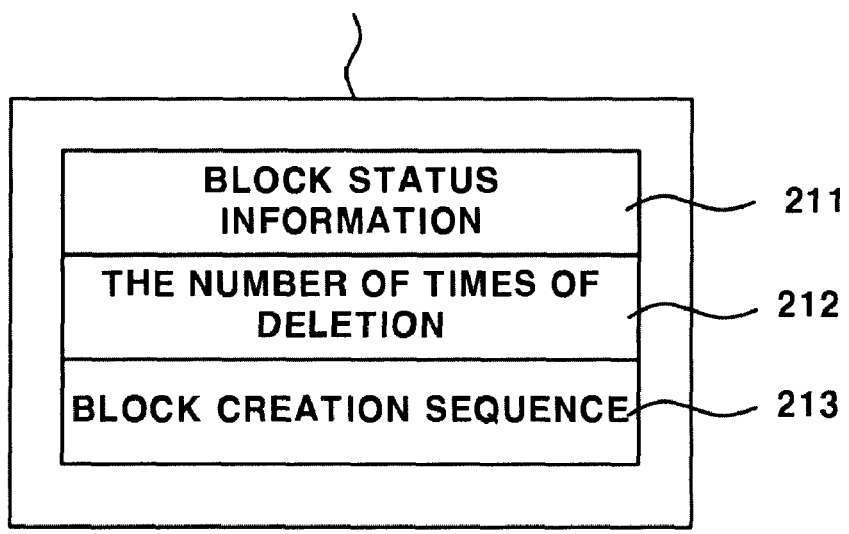
FIG. 4 is a diagram illustrating a block map according to an exemplary embodiment of the invention.

Specifically, as shown in FIG. 4, the map block can store a block map 210 that shows block status information 211, the number of times of deletion 212, and a block creation sequence 213 for each bock. When the write operation by the operation processing unit 130 is committed, the block managing unit 140 collectively converts the block status information 211 of the transaction block into block status information of the data block. At this time, the block map 210 is stored in each of the blocks, and the block status information 211 indicates a block to which the corresponding block belongs among the map block, the data block, the transaction block, and the garbage block. Further, it can be understood that the block creation sequence 213 indicates the sequence in which the corresponding block is created.

Figure 5:
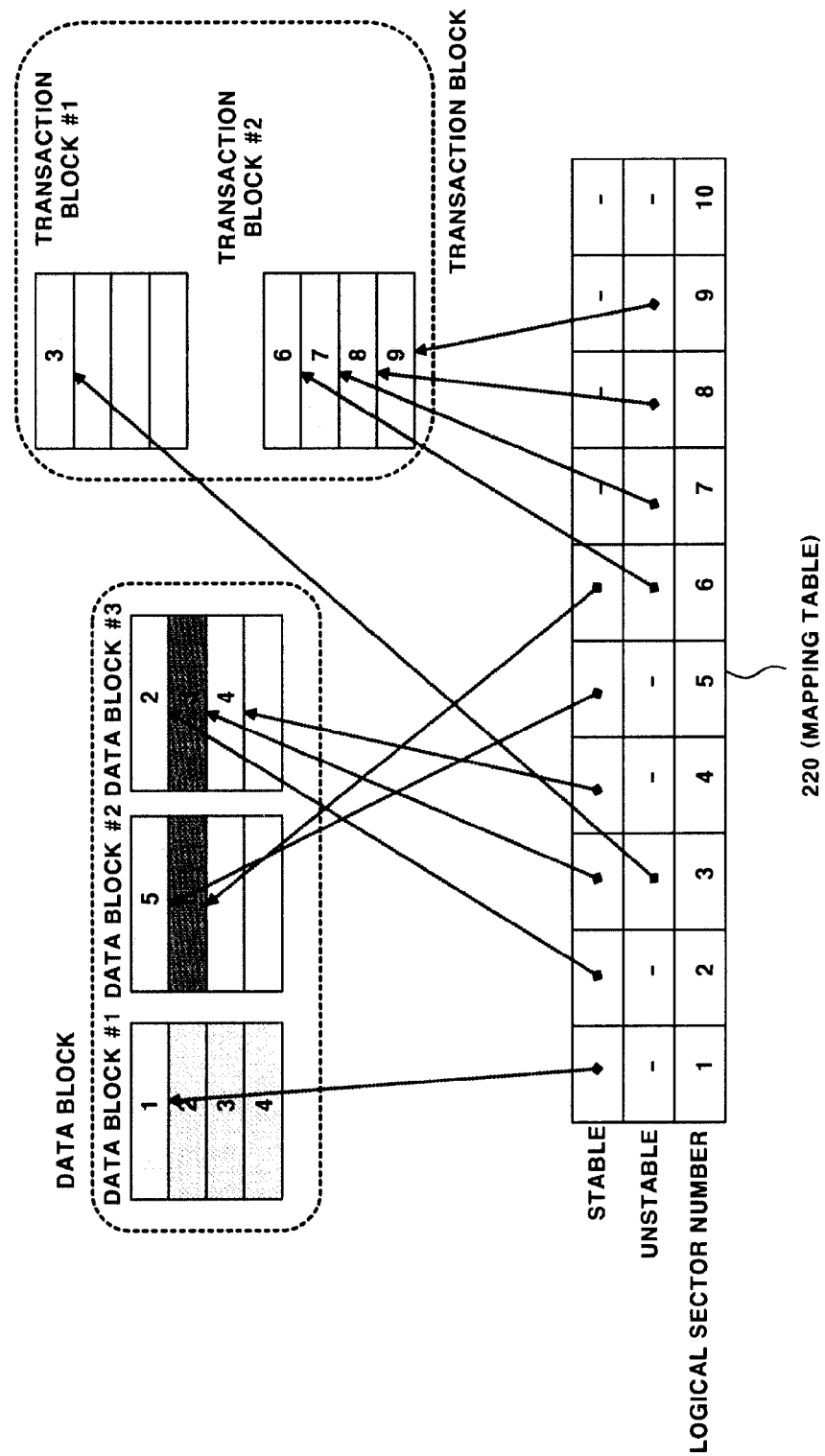
FIG. 5 is a diagram illustrating a mapping table according to an exemplary embodiment of the invention.

Further, the block managing unit 140 creates and stores a mapping table for each block, and the mapping table may be stored in the map block. The block managing unit 140 binarizes and manages the mapping table written in the map block in order to discriminate a stable sector and an unstable sector. Specifically, as shown in FIG. 5, in the mapping table 220, a stable page and an unstable page may be mapped for each logical sector number. The reason why the mapping table 220 is binarized and managed is as follows. The write operation may be cancelled on the unstable page before the write operation is committed, and the information for the existing data should not be deleted until the write operation is committed.

Further, the mapping table 220 needs to be binarized and managed to know the status of the corresponding sector at the time of garbage collection. That is, since the concept of the transaction does not exist in the past, the write operation is performed on a free page in the FTL at the time of writing a sector, and the mapping table for the corresponding sector is changed. Since the existing data is no longer needed in the corresponding sector, a garbage mark is used. However, if the concept of the transaction is applied, at the time of writing the sector, the write operation may be cancelled before the write operation is committed, and the information for the existing data is needed.

Figure 6:
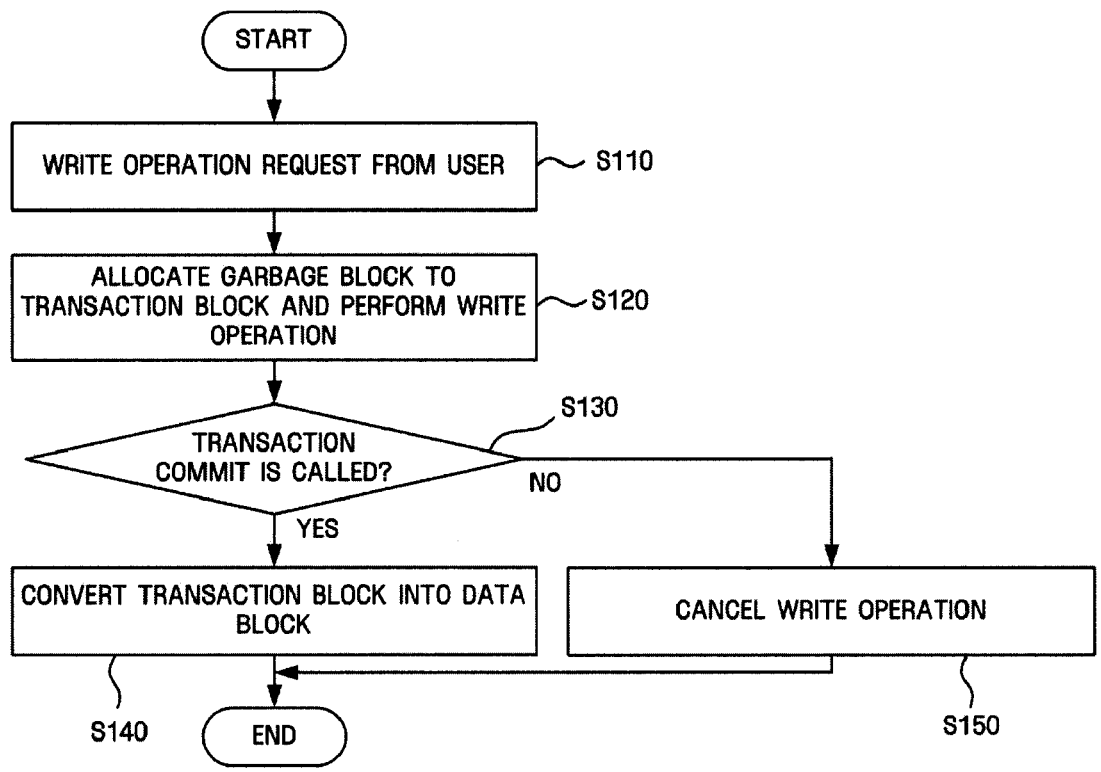
FIG. 6 is a diagram illustrating a method of processing data of a non-volatile memory according to an exemplary embodiment of the invention.

FIG. 6 is a diagram illustrating a method of processing data of a non-volatile memory according to an embodiment of the invention. FIG. 6 exemplifies the case where the non-volatile memory 110 is formatted and the map block and the garbage block only exist. However, the method of processing data may be applied to the case in which not only the map block and the garbage block but also the data block and the transaction block exist.

As shown in FIG. 6, according to the method of processing data of the non-volatile memory, first, a user requests the non-volatile memory 110 to perform a write operation by using the user request unit 120 (Operation S110).

The operation processing unit 130 allocates the garbage block of the non-volatile memory 110 to the transaction block in accordance with the write request from the user and performs the write operation (Operation S120). At this time, the operation processing unit 130 calls the "transaction start" among the APIs of the FTL. The operation processing unit 130 calls a plurality of "write" until the "transaction commit" is called and performs the write operation requested from the user.

At this time, while the operation processing unit 130 performs the write operation in Operation S120 described above, the block allocation or the like can be managed by the block managing unit 140. That is, the block status information in the block map that is stored in the map block and the mapping table are managed by the block managing unit 140.

The operation processing unit 130 determines whether the "transaction commit" is called by the user (Operation S130), and when it is determined that the "transaction commit" is called by the user, the block managing unit 140 converts the plurality of transaction blocks into data blocks (Operation S140). At this time, when the block managing unit 140 converts the plurality of transaction blocks into data blocks, the block managing unit 140 converts the block status information from the block map that is stored in the map block, thereby collectively causing the transaction blocks to be converted into data blocks.

When the "transaction commit" is not called in Operation S130 described above or the power supply is interrupted, the write operation requested from the user is cancelled and the transaction blocks are converted into garbage blocks.

Figure 7:
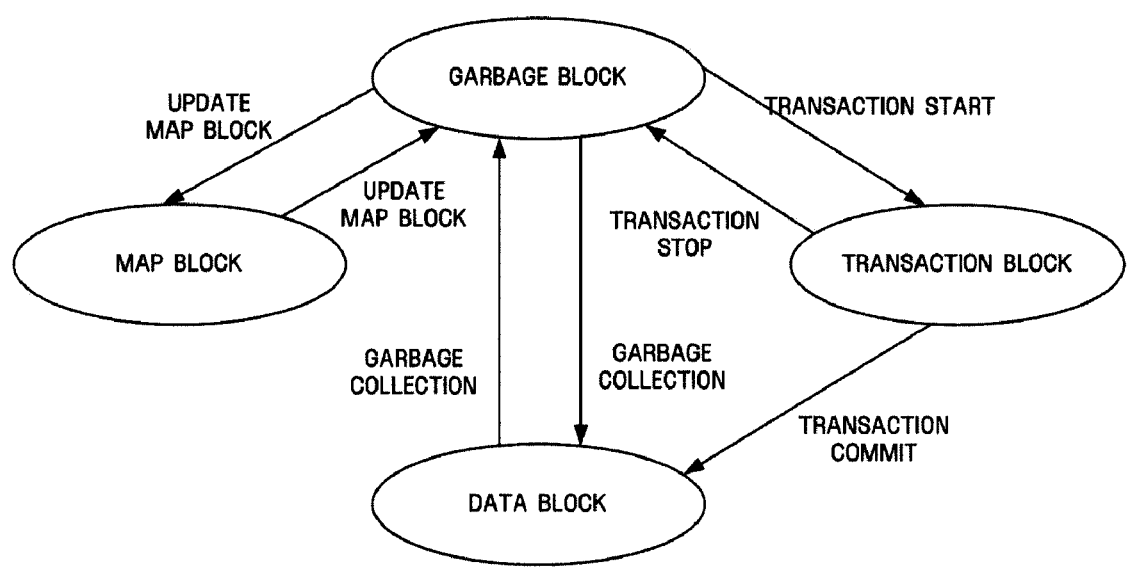
FIG. 7 is a diagram illustrating a variation of each block according to an exemplary embodiment of the invention.

FIG. 7 is a diagram illustrating a variation of each block in a non-volatile memory according to an embodiment of the invention.

As shown in FIG. 7, a garbage block can become a data block by garbage collection and a garbage block can be converted into a transaction block at the time of calling the "transaction start". Further, a transaction block can be converted into a garbage block, when the "transaction stop" is called by the user before the "transaction commit" is called or the power supply is interrupted. The transaction block can be converted into the data block when the "transaction commit" is called.

Meanwhile, the term "unit", that is, "module" or "table" means software, or a hardware component such as an FPGA (Field Programmable Gate Array) or an ASIC (Application Specific Integrated Circuit) and the modules each perform assigned functions. However, the modules are not limited to software or hardware. The modules may be configured in an addressable storage medium, or may be configured to run on at least one processor. Therefore, as an example, the modules include: components such as software components, object-oriented software components, class components, and task components; processors, functions, attributes, procedures, sub-routines, segments of program codes, drivers, firmware, microcodes, circuits, data, databases, data structures, tables, arrays, and variables. The functions provided by the components and the modules may be combined into fewer components and/or modules may be separated into additional components and modules.

Although the invention has been described in connection with exemplary embodiments of the invention, it will be apparent to those skilled in the art that various modifications and changes may be made thereto without departing from the scope and spirit of the invention. Therefore, it should be understood that the above embodiments are not limitative, but illustrative in all aspects.

According to the apparatus and method of processing data of the non-volatile memory according to exemplary embodiments of the invention, the following effects can be achieved.

When the write operation is performed in the non-volatile memory, the write operation is performed by using the transaction blocks. When the write operation is completed, transaction blocks are collectively converted into data blocks, and thus, it is possible to omit a login operation in a database system or a file system and ensure the integrity of the database system or the file system.

Further, since transaction blocks are collectively converted into data blocks, it is possible to adjust to the situation when the power supply is interrupted in the non-volatile memory, which improves the function and stability of the system.

What is claimed is:

1. An apparatus for processing data, the apparatus comprising:
    a non-volatile memory having a plurality of blocks;
    an operation processing unit which, when a write operation is requested from a user, writes data in the plurality of blocks; and
    a block managing unit which collectively converts the plurality of blocks, where the data is written, to a plurality of data blocks and manages statuses of the plurality of blocks to correspond to an operation process performed by the operation processing unit.

2. The apparatus of claim 1, wherein the non-volatile memory comprise:
    a map block where a block map indicating the statuses of the blocks is stored;
    a transaction block allocated when a transaction is performed;
    a data block where committed stable data is written; and
    a garbage block.

3. The apparatus of claim 2, wherein the operation processing unit allocates the garbage block to the transaction block when the write operation is performed.

4. The apparatus of claim 3, wherein the operation processing unit writes data in the transaction block and the block management unit converts the transaction block into the data block when a commit is requested.

5. The apparatus of claim 3, wherein when the data is written in the transaction block, if a commit is not requested due to at least one of an operation stop called by the user, and a power supply interruption, the block management unit converts the transaction block into the garbage block.

6. The apparatus of claim 2, wherein:
    the block managing unit manages the block map of all of the blocks that are included in the non-volatile memory, and the block map includes at least one of block status information, the number of times of deletion, and a life span for each block.

7. The apparatus of claim 6, wherein the block status information indicates which block each block corresponds to among the map block, the transaction block, the data block, and the garbage block.

8. The apparatus of claim 6, wherein the block managing unit creates a mapping table that indicates stable pages and unstable pages that correspond to logical sector numbers.

9. The apparatus of claim 8, wherein the stable pages are included in the data block.

10. The apparatus of claim 8, wherein the unstable pages are included in the transaction block.

11. A method of processing data of a non-volatile memory, the method comprising:
    inputting under control of a processor, a write operation request from a user to a non-volatile memory having a plurality of blocks;
    writing data in the plurality of blocks and collectively converting the plurality of blocks to a plurality of data blocks; and
    managing statuses of the plurality of blocks to correspond to the writing.

12. The method of claim 11, wherein the non-volatile memory include:
    a map block where a block map indicating the statuses of the blocks is stored;
    a transaction block that is allocated when a transaction is performed;
    a data block where committed stable data is written; and
    a garbage block.

13. The apparatus of claim 12, wherein the writing comprises allocating the garbage block to the transaction block when the writing is performed.

14. The method of claim 13, wherein the collectively converting comprises converting the transaction block into the data block when a commit is requested.

15. The method of claim 13, wherein the method comprises converting the transaction block into the garbage block, if a commit is not requested due to at least one of an operation stop called by the user, and a power supply interruption, when the data is written in the transaction block.

16. The method of claim 12, wherein:
    the method comprises managing the block map of all of the blocks that are included in the non-volatile memory, and the block map includes at least one of block status information, the number of times of deletion, and a life span for each of the blocks.

17. The method of claim 16, wherein the block status information indicates which block each of the blocks corresponds to among the map block, the transaction block, the data block, and the garbage block.

18. The method of claim 16, wherein the method comprises creating a mapping table that indicates stable pages and unstable pages that correspond to logical sector numbers.

19. The method of claim 18, wherein the stable pages are included in the data block.

20. The method of claim 18, wherein the unstable pages are included in the transaction block.

* * * * *